United States Patent
Nagarajan et al.

(10) Patent No.: US 11,063,860 B2
(45) Date of Patent: Jul. 13, 2021

(54) CONTROL PLANE-BASED EVPN OPTIMIZED INTER-SUBNET MULTICAST (OISM) FORWARDING

(71) Applicant: Juniper Networks, Inc., Sunnyvale, CA (US)

(72) Inventors: Vikram Nagarajan, Bangalore (IN); Princy T. Elizabeth, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/577,717

(22) Filed: Sep. 20, 2019

(65) Prior Publication Data

US 2021/0092045 A1    Mar. 25, 2021

(51) Int. Cl.
*H04L 12/761* (2013.01)
*H04L 12/46* (2006.01)
*H04L 12/721* (2013.01)

(52) U.S. Cl.
CPC .......... *H04L 45/16* (2013.01); *H04L 12/4641* (2013.01); *H04L 45/66* (2013.01)

(58) Field of Classification Search
CPC ......... H04L 45/16; H04L 45/66; H04L 45/26; H04L 12/4621
USPC ........................................................ 370/390
See application file for complete search history.

(56) References Cited

U.S. PATENT DOCUMENTS

| | | | | |
|---|---|---|---|---|
| 7,830,825 | B2 * | 11/2010 | Fu .......................... | H04L 63/104 370/312 |
| 10,666,459 | B1 * | 5/2020 | Sajassi ..................... | H04L 45/50 |
| 2013/0329727 | A1 * | 12/2013 | Rajagopalan ....... | H04L 12/4641 370/390 |
| 2014/0003285 | A1 * | 1/2014 | Jain ......................... | H04L 45/02 370/254 |
| 2014/0023074 | A1 * | 1/2014 | Mishra .................... | H04L 45/66 370/390 |
| 2016/0277210 | A1 | 9/2016 | Lin et al. | |
| 2019/0132241 | A1 * | 5/2019 | Vattem ................ | H04L 12/4641 |
| 2019/0229937 | A1 | 7/2019 | Nagarajan et al. | |
| 2021/0021509 | A1 * | 1/2021 | Sajassi .................... | H04L 45/66 |

OTHER PUBLICATIONS

Sajassi et al., "BGP MPLS-Based Ethernet VPN," Internet Engineering Task Force (IETF), RFC 7432, Feb. 2015, 56 pp.

(Continued)

*Primary Examiner* — Candal Elpenord
(74) *Attorney, Agent, or Firm* — Shumaker & Sieffert, P.A.

(57) ABSTRACT

In general, techniques are described for providing control plane-based OISM forwarding. For example, network devices may configure two types of next hops for a multicast group. For example, the next hops may include an L2-switched next hop and an L3-routed next hop. The L2-switched next hop specifies the one or more other PE devices as a next hop for multicast traffic for the multicast group that is received on an access-facing interface of the PE device and switched on a source Virtual Local Area Network (VLAN). The L3-routed next hop specifies a list (e.g., either an empty list or specifying incapable Integrated Routing and Bridging (IRB) devices) as a next hop for multicast traffic for the multicast group that is received over an EVPN core on a core-facing interface of the PE device and locally routed from the source VLAN to a listener VLAN.

20 Claims, 4 Drawing Sheets

(56) References Cited

OTHER PUBLICATIONS

Rosen, "BGP/MPLS IP Virtual Private Networks (VPNs)," Network Working Group, RFC 4364, Feb. 2006, 48 pp.

Sajassi et al., "Integrated Routing and Bridging in EVPN" draft-ietf-bess-evpn-inter-subnet-forwarding-08, BESS Workgroup, Internet-Draft, Internet Engineering Task Force (IETF), Mar. 4, 2019, 33 pp.

Fenner "Internet Group Management Protocol, Version 2" Network Working Group, RFC 2236, Nov. 1997, 24 pp.

Cain et al. "Internet Group Management Protocol, Version 3" Network Working Group, RFC 3376, Oct. 2002, 53 pp.

Holbrook et al., "Using Internet Group Management Protocol Version 3 (IGMPv3) and Multicast Listener Discovery Protocol Version 2 (MLDv2) for Source-Specific Multicast," Network Working Group; RFC 4604, Aug. 2006, 11 pp.

Sajassi et al., "IGMP and MLD Proxy for EVPN," draft-sajassi-bess-evpn-igmp-mld-proxy-01, Internet-Draft, BESS Working Group, Oct. 28, 2016, 25 pp.

Sajassi et al., "IGMP and MLD Proxy for EVPN," draft-ietf-bess-evpn-igmp-mld-proxy-03, Internet-Draft, BESS Working Group, Jun. 10, 2019, 31 pp.

Adams et al., "Protocol Independent Multicast—Dense Mode (PIM-DM): Protocol Specification (Revised)," Network Working Group, RFC 3973, Jan. 2005, 61 pp.

Fenner et al., "Protocol Independent Multicast—Sparse Mode (PIM-SIM) : Protocol Specification (Revised)," Network Working Group, RFC 4601, Aug. 2006, 150 pp.

Holbrook et al., "Source-Specific Multicast for IP," Network Working Group, RFC 4607,The Internet Society, Aug. 2006, 19 pp.

Handley et al., "Bidirectional Protocol Independent Multicast (BIDIR-PIM)," Network Working Group, RFC 5015, Oct. 2007, 43 pp.

Lin et al. "EVPN Optimized Inter-Subnet Multicast (OISM) Forwarding" draft-ietf-bess-evpn-irb-mcast-03, BESS, Internet-Draft, Internet Engineering Task Force (IETF), Aug. 16, 2019, 77 pp.

Deering, "Host Extensions for IP Mutlicasting" Network Working Group; RFC 1112, Aug. 1989, 16 pp.

Extended Search Report from counterpart European Application No. 19213074.8, dated Apr. 22, 2020, 11 pp.

Lin et al. "EVPN Inter-subnet Multicast Forwarding" draft-lin-bess-evpn-irb-mcast-03, BESS, Internet-Draft, Internet Engineering Task Force (IETF), Mar. 13, 2017, 25 pp.

\* cited by examiner

CONTROL PLANE-BASED EVPN OPTIMIZED INTER-SUBNET MULTICAST (OISM) FORWARDING

TECHNICAL FIELD

The invention relates to computer networks and, more particularly, to distribution of multicast traffic over computer networks.

BACKGROUND

A computer network is a collection of interconnected computing devices that can exchange data and share resources. Example computing devices include routers, switches or other layer two (L2) devices that operate within the second layer of the Open Systems Interconnection (OSI) reference model, i.e., the data link layer, and routers or other layer three (L3) devices that operate within the third layer of the OSI reference model, i.e., the network layer. Network devices within computer networks often include a control unit that provides control plane functionality for the network device and forwarding components for routing or switching data units.

An Ethernet Virtual Private Network ("EVPN") may be used to extend two or more remote L2 customer networks through an intermediate L3 network (usually referred to as a "provider network"), in a transparent manner, i.e., as if the intermediate L3 network does not exist. In particular, the EVPN transports L2 communications, such as Ethernet packets or "frames," between customer networks via the intermediate L3 network. In a typical configuration, provider edge ("PE") network devices (e.g., routers and/or switches) coupled to the customer edge ("CE") network devices of the customer networks define label switched paths (LSPs) within the provider network to carry encapsulated L2 communications as if these customer networks were directly attached to the same local area network (LAN). In some configurations, the PE devices may also be connected by an IP infrastructure in which case IP/GRE tunneling or other IP tunneling can be used between the network devices. Additional example information with respect to EVPN is described in "BGP MPLS-Based Ethernet VPN," RFC 7432, February 2015, the entire contents of which is incorporated by reference herein.

Examples of computer networks include enterprise networks, branch networks, service provider networks, home networks, virtual private networks (VPNs), local area networks (LANs), virtual LANs (VLANs) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content.

In some examples, a computer network may implement Optimized Inter-Subnet Multicast (OISM) to optimize IP multicast forwarding within the EVPN tenant domain. For example, network devices that implement OISM enable inter-subnet IP multicast traffic to be routed among the VLANs of a given tenant, while still making intra-subnet IP multicast traffic appear to be bridged. To implement OISM, forwarding engines (e.g., ASICs or other silicon devices) of network devices are typically programmed to support OISM forwarding.

SUMMARY

In general, the disclosure describes techniques for providing control plane-based OISM forwarding. For example, in accordance with the disclosed techniques, PE devices may configure two types of forwarding next hops (e.g., Selective Multicast Ethernet Tag (SMET) next hops) for a multicast group. The SMET forwarding next hops may include an L2-switched next hop and an L3-routed next hop. The L2-switched next hop may include one or more remote PE devices that advertised a SMET route to request multicast traffic from the multicast group. PE devices may switch multicast traffic for the multicast group that is received on an access-facing interface from a source VLAN to core-facing interfaces on the same VLAN and use the L2-switched next hop to forward the multicast traffic to the remote PE devices that advertised the SMET route. The L3-routed next hop may include an empty list of remote PE devices to prevent the multicast traffic for the multicast group that is received from the EVPN core on a source VLAN and routed onto a listener VLAN from being sent back to the EVPN core. For example, a PE device may receive multicast traffic for the multicast group over the EVPN core via a core-facing interface on a source VLAN. The PE device may use Integrated Routing and Bridging (IRB) interfaces to locally route inter-subnet traffic from the source VLAN to the listener VLAN that includes an interested receiver for the multicast traffic, and since the L3-routed next hop has an empty list of remote PE devices, the PE device does not send the multicast traffic back to the EVPN core.

In some examples, a PE device may generate an L3-routed next hop that includes a next hop to IRB incapable PE devices. As one example, a PE device may not be configured to locally route inter-subnet traffic between VLANs, and thus is IRB incapable. To send multicast traffic to the IRB incapable PE device, a PE device may configure an L3-routed next hop that includes a next hop to the IRB incapable PE device. In this way, when the PE device receives multicast traffic over the EVPN core via a core-facing interface on the source VLAN, the PE device may use IRBs to locally route inter-subnet traffic from the source VLAN to a listener VLAN, and may then use the L3-routed next hop to send the multicast traffic back to the EVPN core to only the IRB incapable PE device.

The techniques described in this disclosure may provide one or more technical advantages that realizes a practical advantage. For example, by configuring an L2-switched next hop that specifies remote PE devices and an L3-routed next hop with an empty list of remote PE devices, PE devices may implement OISM forwarding via control plane-based programming of next hops. This enables PE devices to perform OISM forwarding without necessitating forwarding engines to be pre-programmed to support OISM. Moreover, by configuring an L2-switched next hop that specifies remote PE devices and an L3-routed next hop that specifies IRB incapable PE devices, PE devices may operate as Internet Protocol Multicast Gateway (IPMG) devices to implement OISM forwarding via control plane-based programming of next hops to accommodate IRB incapable PE devices without necessitating forwarding engines to be pre-programmed to support OISM.

In one example, a method includes receiving, by a provider edge (PE) device of a plurality of PE devices configured with an Ethernet Virtual Private Network (EVPN) instance, a multicast route from one or more other PE devices of the plurality of PE devices requesting multicast traffic for a multicast group. The method also includes configuring, by the PE device, next hops for the multicast group, wherein the next hops comprise a layer 2-switched next hop that specifies the one or more other PE devices as a next hop for multicast traffic for the multicast group that is received on an access-facing interface of the PE device and switched on a source Virtual Local Area Network (VLAN), and wherein the next hops further comprise a layer 3-routed next hop that specifies a list as a next hop for multicast traffic for the multicast group that is received over an EVPN core on a core-facing interface of the PE device and locally routed from the source VLAN to a listener VLAN. The method further includes receiving, by the PE device, multicast traffic on an interface of a plurality of interfaces, wherein the plurality of interfaces includes the access-facing interface and the core-facing interface. Moreover, the method includes selectively using, by the PE device, a corresponding one of the next hops based on whether the multicast traffic is switched on the source VLAN or locally routed from the source VLAN to the listener VLAN.

In another example, a network device operable as a provider edge (PE) device comprising one or more processors operably coupled to a memory, wherein the one or more processors are configured to: receive a multicast route from one or more other PE devices of a plurality of PE devices including the PE device requesting multicast traffic for a multicast group; configure next hops for the multicast group, wherein the next hops comprise a layer 2-switched next hop that specifies the one or more other PE devices as a next hop for multicast traffic for the multicast group that is received on an access-facing interface of the PE device and switched on a source Virtual Local Area Network (VLAN), and wherein the next hops further comprise a layer 3-routed next hop that specifies a list as a next hop for multicast traffic for the multicast group that is received over an EVPN core on a core-facing interface of the PE device and locally routed from the source VLAN to a listener VLAN; receive multicast traffic on an interface of a plurality of interfaces, wherein the plurality of interfaces includes the access-facing interface and the core-facing interface; and selectively use a corresponding one of the next hops based on whether the multicast traffic is switched on the source VLAN or locally routed from the source VLAN to the listener VLAN.

In another example, a non-transitory computer-readable medium comprising instructions for causing one or more programmable processors of a provider edge (PE) device to: receive a multicast route from one or more other PE devices of a plurality of PE devices including the PE device requesting multicast traffic for a multicast group; configure next hops for the multicast group, wherein the next hops comprise a layer 2-switched next hop that specifies the one or more other PE devices as a next hop for multicast traffic for the multicast group that is received on an access-facing interface of the PE device and switched on a source Virtual Local Area Network (VLAN), and wherein the next hops further comprise a layer 3-routed next hop that specifies a list as a next hop for multicast traffic for the multicast group that is received over an EVPN core on a core-facing interface of the PE device and locally routed from the source VLAN to a listener VLAN; receive multicast traffic on an interface of a plurality of interfaces, wherein the plurality of interfaces includes the access-facing interface and the core-facing interface; and selectively use a corresponding one of the next hops based on whether the multicast traffic is switched on the source VLAN or locally routed from the source VLAN to the listener VLAN.

The details of one or more aspects of the techniques are set forth in the accompanying drawings and the description below. Other features, objects, and advantages of the techniques of this disclosure will be apparent from the description and drawings, and from the claims.

BRIEF DESCRIPTION OF DRAWINGS

Like reference characters denote like elements throughout the figures and text.

DETAILED DESCRIPTION

Figure 1:
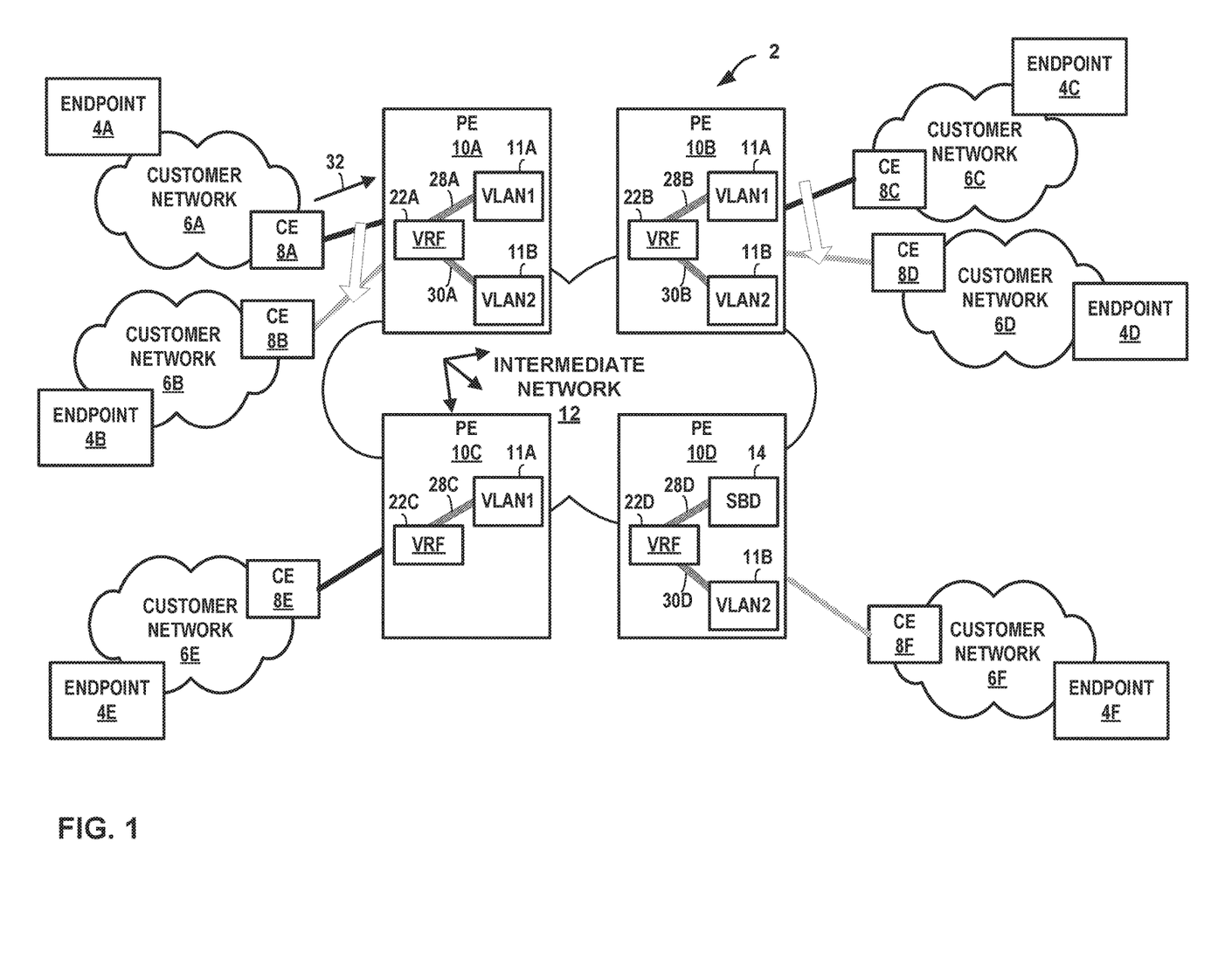
FIG. 1 is a block diagram illustrating an example network system for providing control plane-based OISM forwarding, in accordance with the techniques described in this disclosure.

FIG. 1 is a block diagram illustrating an example network system 2 for providing control plane-based Optimized Inter-Subnet Multicast (OISM) forwarding, in accordance with the techniques described in this disclosure. As shown in FIG. 1, network system 2 includes customer networks 6A-6F (collectively, "customer networks 6") and an intermediate network 12 (alternatively referred to herein as the "EVPN core 12") configured to host an EVPN core to connect customer networks 6. Provider Edge (PE) devices 10A-10D (collectively, "PE devices 10"). PE devices 10A-10D (collectively, "PE devices 10") may each represent a router, switch or other suitable network devices that participate in an L2 virtual private network ("L2VPN") service, such as an EVPN.

CE devices 8 may each represent a host, router, switch, or other suitable network device that participates in an EVPN. CE devices 8 may be edge devices for customer networks, e.g., customer networks 6, such as geographically or logically separated sites of an enterprise, networks for different customers of the intermediate network 12, or tenants or tenant systems of the intermediate network 12. Customer networks 6 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network system 2 illustrated in FIG. 1 is merely an example. For example, an enterprise may include any number of customer networks.

Intermediate network 12 may represent a service provider network that is owned and operated by a service provider, which is usually a large telecommunications entity or corporation. Intermediate network 12 represents an L3 computer network, where reference to a layer followed by a number refers to a corresponding layer in the Open Systems Interconnection (OSI) model. Intermediate network 12 is a layer 3 (L3) network in the sense that it natively supports L3 operations as described in the OSI model. Common L3 operations include those performed in accordance with L3 protocols, such as the Internet protocol (IP). L3 is also known as a "network layer" in the OSI model and the "IP layer" in the TCP/IP model, and the term L3 may be used interchangeably with the phrase "network layer" and "IP" throughout this disclosure.

Intermediate network 12 may be coupled to one or more networks administered by the provider of intermediate network 12 or other providers, and may thus form part of a large-scale public network infrastructure, e.g., the Internet. Consequently, customer networks 6 may be viewed as edge networks of the Internet. Intermediate network 12 may provide computing devices, e.g., endpoints 4A-4F (collectively, "endpoints 4"), within customer networks 6 with access to the Internet, and may allow the computing devices within the customer networks to communicate with each other.

In some cases, intermediate network 12 represents a data center Layer 2/Layer 3 switching fabric (or "data center fabric network") that interconnects CE devices for tenants of the data center, where a tenant may represent an organization or a logical partitioning of resources, data, and/or applications within the data center. Although not shown, intermediate network 12 may include a variety of network devices other than PE devices 10. For instance, intermediate network 12 may include a route reflector, one or more provider routers (also known as "P" or "core" routers), switches, and so forth. Further, intermediate network 12 may couple to one or more computer networks not depicted in FIG. 1. Moreover, although the elements of network system 2 are illustrated as being directly coupled, it should be understood that the elements of network system 2 may not be directly coupled.

Intermediate network 12 typically provides a number of residential and business services, including residential and business class data services (which are often referred to as "Internet services" in that these data services permit access to the collection of publicly accessible networks referred to as the Internet), residential and business class telephone and/or voice services, and residential and business class television services. One such business data service offered by a service provider of intermediate network 12 includes EVPN service. For example, an EVPN is a service that provides a form of L2 connectivity across an intermediate L3 network, such as intermediate network 12, to interconnect L2 customer networks, such as customer networks 6, that are usually located in different geographic areas. Often, an EVPN is transparent to the customer networks in that these customer networks are not aware of the intervening intermediate service provider network and instead act and operate as if these two customer networks were directly connected and formed a single L2 network. In this way, an EVPN enables a form of a transparent LAN connection between two geographically distant customer sites that each operates an L2 network and, for this reason, EVPN may also be referred to as a "transparent LAN service."

To configure an EVPN, a network operator of intermediate network 12 configures, via configuration or management interfaces, various devices included within intermediate network 12 that interface with L2 customer networks 6. An EVPN instance (EVI) is configured within intermediate network 12 to enable computing devices of customer networks 6 to communicate with one another via the EVI as if the computing devices of customer networks 6 were directly connected via an L2 network or link. As one example, when configured to use the EVI, CE device 8A is able to communicate with CE device 8B as if CE devices 8A and 8B were directly connected via an L2 network or link. Each of PE devices 10 (e.g., PE devices 10A and 10B in the above example) is configured with the EVI and exchanges EVPN routes to implement the EVI.

In the example of FIG. 1, when providing the EVPN service to customer networks 6, PE devices 10 and CE devices 8 typically perform media access control (MAC) address learning to efficiently forward L2 network communications in system 2. That is, as PE devices 10 and CE devices 8 forward Ethernet frames, the routers learn L2 state information for the L2 network, including MAC addressing information for customer endpoints 4 within the customer network and the physical ports through which customer endpoints 4 are reachable. PE devices 10 and CE devices 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the destination L2 address (e.g., MAC address) specified in the Ethernet frame. In this case, the router forwards a single copy of the Ethernet frame out the associated interface.

In the EVPN implemented in system 2, PE devices 10 may use control plane signaling with different route types to provision the EVPN service in intermediate network 12. EVPN defines BGP Network Layer Reachability Information (NLRI), and in particular, defines different route types. The EVPN NLRI is carried in BGP using BGP Multiprotocol Extensions. For examples, a MAC advertisement route (otherwise referred to as "EVPN Type 2 route") is used to advertise MAC addresses and IP addresses that may be associated with the MAC addresses. In order to advertise the MAC advertisement route, PE devices 10 learn MAC addresses for customer endpoints 4 reachable through local attachment circuits. A MAC advertisement route may include a route distinguisher, Ethernet TAG identifier, MAC address information, Multiprotocol Label Switching (MPLS) label, etc. A MAC advertisement route may also include IP address information that is associated with a given MAC address. In this way, PE devices 10 use BGP to advertise and share the MAC addresses learned when forwarding L2 communications associated with the EVPN.

An EVPN may operate over a Multi-Protocol Label Switching (MPLS) configured network and use MPLS labels to forward network traffic accordingly. MPLS is a mechanism used to engineer traffic patterns within Internet Protocol (IP) networks according to the routing information maintained by the routers in the networks. By utilizing MPLS protocols, such as the Label Distribution Protocol (LDP) or the Resource Reservation Protocol with Traffic Engineering extensions (RSVP-TE), a source device can request a path through a network to a destination device, i.e., a Label Switched Path (LSP). An LSP defines a distinct path through the network to carry MPLS packets from the source device to a destination device. Using an MPLS protocol, each router along an LSP allocates a label and propagates the label to the closest upstream router along the path. Routers along the path add or remove the labels and perform other MPLS operations to forward the MPLS packets along the established path.

As shown in the example of FIG. 1, intermediate network 12 may provide an MPLS core or IP tunneling infrastructure for sending network packets to and from CE devices 8, which may include sending the network packets over a mesh of tunnels interconnecting PE devices 10. Intermediate network 12 and the EVPN instance may include additional PE devices 10. Each of PE devices 10 implement the MPLS protocol and apply one or more MPLS labels, i.e., a label stack, to network packets in accordance with routing and forwarding information configured at each respective PE device.

In some examples, an EVI may be associated with a virtual routing and forwarding instance (VRF) on a PE device, such as any of PE devices 10A-10D. As shown in FIG. 1, PE devices 10 may implement respective VRFs 22A-22D (collectively, "VRFs 22") for the EVI. Generally, VRFs permit multiple routing tables to exist within a single physical router. An attachment circuit may be associated with a particular VRF, and the particular VRF may be configured to forward traffic for the attachment circuit. VRFs 22 may be configured to include functionality described in "BGP/MPLS IP Virtual Private Networks (VPNs)," RFC 4364, February 2006, which is hereby incorporated by reference herein in its entirety.

As shown in FIG. 1, PE devices 10 may configure logical broadcast domains, e.g., Virtual Local Area Networks (VLANs), of an EVI. VLANs provide segmentation services by which network devices may be grouped together into a logical subnetwork. For example, PE devices 10 may configure one or more VLAN instances, e.g., VLAN 11A (illustrated in FIG. 1 as "VLAN1") and/or VLAN 11B (illustrated in FIG. 1 as "VLAN2"). Each VLAN instance may represent functionality implemented by the respective PE device for forwarding network packets within one or more L2 subnetworks identified by the respective one or more VLAN identifiers. In the example of FIG. 1, VRFs 22 may include MAC addresses and IP addresses on PE devices 10. VRFs 22 may also include a bridge table, where the bridge table corresponds to a particular VLAN.

PE devices 10 may also implement Integrated Routing and Bridging (IRB), which supports layer 2 bridging and layer 3 routing on the same interface. IRB allows PE devices 10 to route local packets to another routed interface or to another bridging domain that has a layer 3 protocol configured. IRB interfaces (or "IRBs") are logical interfaces that enable the PE device to recognize which packets are being sent to local addresses so that they are bridged whenever possible and are routed only when needed. IRB interfaces are L3 interfaces associated with L2 domains. PE devices 10 connect to L2 domains using L2 interfaces. Accordingly, IRBs may be used to locally route inter-subnet traffic. For instance, using one or more IRBs, a PE device may route inter-subnet traffic between a source VLAN (e.g., VLAN 11A) and a listener VLAN (e.g., VLAN 11B). In the example of FIG. 1, PE device 10A includes IRB 28A with the VLAN 11A bridging domain and IRB 30A with the VLAN 11B bridging domain; PE device 10B includes IRB 28B with the VLAN 11A bridging domain and IRB 30B with the VLAN 11B bridging domain; PE device 10C includes IRB 28C with the VLAN 11A bridging domain; and PE device 10D includes IRB 30D with the VLAN 11B bridging domain. In the example of FIG. 1, VRFs 22 may include IP routes on a PE device. The IRBs connect the VRF including IP routes to a particular VLAN.

IRBs 28, 30 may serve as IP gateways for inter-subnet traffic for the EVPN instance. PE device 10A, for example, may be configured with multiple IRBs associated with VRF 22A and having different VLAN-based bridging domains and, accordingly, may route traffic between VLAN 11A and VLAN 11B using the multiple IRBs. One or more of PE devices 10 may implement IRB as described in "Integrated Routing and Bridging in EVPN," draft-ietf-bess-evpn-inter-subnet-forwarding-08, Mar. 4, 2019, which is hereby incorporated by reference herein in its entirety. VLAN 11A and VLAN 11B are virtual L2 networks for L3 subnets reachable via PE devices 10 using EVPN.

System 2 may be configured to support multicast traffic over EVPN. Multicast traffic may include Internet Protocol Television (IPTV), desktop conferences, corporate broadcasts, music and/or video webcasts, and other forms of multimedia content. In general, multicast traffic is associated with specific multicast groups. More specifically, multicast traffic is typically designated by a unique combination of a particular multicast group and a particular source for the multicast group. For example, multicast traffic, such as a particular multicast stream of content, may be uniquely designated with a (Source, Group), i.e., (S, G), label to designate a multicast source and a multicast group to which the traffic belongs. In general, multicast forwarding state for (*, G) or (S, G) entries is the information by which routers use for forwarding unicast or multicast packets. S is the source IP address, G is the multicast group address, and * represents any source sending the multicast group G. Routers may keep track of the multicast forwarding state for the incoming and outgoing interfaces for each group. Multicast forwarding state for an entry stored by a router may specify an output interface of the router for multicast traffic matching the entry.

In the example of FIG. 1, endpoint 4A operates as source for multicast traffic (otherwise referred to herein as "multicast source 4A") to be delivered to receivers of the multicast traffic by way of the EVPN. Endpoints 4C and 4E are multicast receivers on VLAN 11A and endpoints 4B, 4D and 4F are multicast receivers on VLAN 11B.

Endpoints 4 may implement Internet Group Management Protocol (IGMP) by which endpoints 4 announce their interest in receiving particular multicast traffic. Endpoints 4 send IGMP reports to any immediately neighboring multicast routing devices to indicate their interest in receiving multicast traffic from multicast groups on a given VLAN. For example, one or more multicast receivers, e.g., endpoints 4B-4F, may each use IGMP to send Join and Leave messages to its local multicast router, e.g., PE devices 10. PE devices 10 may receive the Join and Leave messages from endpoints 4 connected to CE routers 8 and may route multicast traffic to CE devices 8 based on the (S, G) or (*, G) label of the multicast traffic. Additional details of IGMP are provided within "Host Extensions for IP Multicasting," Internet Engineering Task Force (IETF), RFC 1112, August 1989; "Internet Group Messaging Protocol, Version 2," IETF, RFC 2236, November 1997; "Internet Group Management Protocol, Version 3," IETF, RFC 3376, October 2002; "Using Internet Group Management Protocol Version 3 (IGMPv3) and Multicast Listener Discovery Protocol Version 2 (MLDv2) for Source-Specific Multicast," IETF, RFC 4604, August 2006; and "IGMP and MLD Proxy for EVPN," draft-saassi-bess-evpn-igmp-mld-proxy-01, Oct. 28, 2016, the entire contents of each of which is incorporated by reference herein.

Upon receiving, from endpoints 4, IGMP reports to subscribe in the membership of a specific multicast group, PE devices forward this information to the other PE devices over the EVPN using Ethernet Multicast Source Group Route Network Layer Reachability Information (NLRI). As one example, PE devices 10 may use Selective Multicast Ethernet Tag (SMET) routes (i.e., EVPN Type-6 route) to set up a path to selectively forward and receive multicast traffic over an EVPN core, e.g., intermediate network 12. That is, PE devices 10 may send SMET routes to indicate their interest for a specific multicast group or source-group combination. A SMET route may include a multicast source address, multicast group address, and the network address of the PE device. Additional examples of SMET routes are described in "IGMP and MLD Proxy for EVPN," draft-ietf-bess-evpn-igmp-mld-proxy-03, Jun. 10, 2019, the entire contents of which is incorporated by reference herein. In the example of FIG. 1, PE devices 10B-10D may each send a respective SMET route to ingress PE device 10A to receive multicast traffic from multicast source 4A.

PE devices 10 may use the SMET routes to build a list of SMET next hops which can be used to selectively replicate and forward multicast traffic. SMET next hops are a list of outgoing interfaces (OIF) identifying the interested PE devices. Multicast groups are mapped to SMET next hops.

PE devices 10 with an IRB interface may use SMET routes to create Protocol Independent Multicast (PIM) states that allow PE devices 10 to send multicast traffic across VLANs. As one example, PE devices 10 may implement PIM to control delivery of multicast traffic over an EVPN core, e.g., intermediate network 12, from multicast sources to multicast receivers for particular multicast groups. For example, PE devices 10 may use PIM to exchange multicast information for building and modifying multicast distribution trees and forwarding multicast traffic. PIM Join messages typically includes a unicast destination address of the multicast source, e.g., multicast source 4A. Each PE device that receives the PIM Join message may update one or more of its forwarding units to forward multicast traffic received from the multicast source to multicast receivers. The PIM protocol may operate in several different modes, including Dense Mode (DM), Sparse Mode (SM) in Source-Specific Multicast (SSM) mode or Any Source Multicast (ASM) mode, and Bidirectional (BIDIR) mode. Additional information regarding PIM protocols may be found in Adams, A. et al., "Protocol Independent Multicast Version 2-Dense Mode Specification," RFC 3973, 2005; Fenner, B., et al., "Protocol Independent Multicast-Sparse Mode (PIM-SM): Protocol Specification (Revised)," RFC 4601, 2006; Holbrook, H. and B. Cain, "Source-Specific Multicast for IP," RFC 4607, 2006; and Handley, M., et al., "Bidirectional Protocol Independent Multicast (BIDIRPIM)," RFC 5015, 2007, the entire contents of each of which are incorporated by reference herein. Although the example of FIG. 1 is described with respect to PIM trees, multicast traffic may alternatively be tunneled using, for example, Resource Reservation Protocol with Traffic Engineering (RSVP-TE) label-switched path (LSPs), multicast Label Distribution Protocol (mLDP) point-to-multipoint (P2MP) trees, and/or mLDP multipoint-to-multipoint (MP2MP) LSPs.

In some examples, one or more of the PE devices may not be configured with all VLANs. In these examples, when an ingress PE device receives multicast traffic on a source VLAN, the ingress PE device typically sends the multicast traffic to one or more egress PE devices that are configured with the source VLAN, but does not send the multicast traffic to PE devices that are not configured with the source VLAN. To send multicast traffic to an egress PE device that is not configured with the source VLAN, PE devices may typically implement Optimized Inter-Subnet Multicast (OISM) instead of other multicast forwarding models (e.g., Centrally-Routed model) to prevent hairpinning and severe bandwidth consumption.

PE devices that implement OISM may send multicast traffic even though a remote PE device is not provisioned with the source VLAN and/or the ingress PE device is not configured with the listener VLAN. For example, PE devices may be provisioned with a Supplementary Broadcast Domain (SBD) that is treated in the control plane as a real broadcast domain with an IRB interface, but does not have any attachment circuits. In examples where the egress PE device is not provisioned with the source VLAN, the egress PE device will treat a multicast packet that it receives as if its source VLAN were the SBD and locally route inter-subnet traffic using IRBs between the SBD and listener VLAN. In this way, a multicast packet may be transmitted from a source VLAN to a listener VLAN even though the ingress PE device is not configured with the listener VLAN and/or the egress PE device is not configured with the source VLAN.

PE devices that implement OISM are required to prevent the sending of multicast traffic back into the EVPN core after locally routing inter-subnet traffic between multiple VLANs. This prevents PE devices from receiving duplicate multicast traffic from other PE devices. Additional examples of OISM are described in "EVPN Optimized Inter-Subnet Multicast (OISM) Forwarding," draft-ietf-bess-evpn-irb-mcast-03, Aug. 16, 2019, the entire contents of which is incorporated by reference herein.

Typically, forwarding engines (e.g., ASICs or other silicon devices) of PE devices are programmed to implement OISM forwarding. However, in some examples, the forwarding engines of one or more PE devices are not programmed to implement OISM forwarding. In these examples, the PE devices with forwarding engines that are not programmed to implement OISM may send multicast traffic back into the EVPN core after locally routing inter-subnet traffic between multiple VLANs, which may cause other PE devices to receive duplicates of the multicast traffic.

In accordance with the techniques described in this disclosure, PE devices 10 may implement control plane-based OISM forwarding. As described above, PE devices 10 may use the SMET routes to build a list of SMET next hops (e.g., a list of outgoing interfaces) stored in routing information (e.g., VRFs) which can be used to selectively replicate and forward multicast traffic. In accordance with the techniques of this disclosure, PE devices 10 may configure two types of SMET forwarding next hops for a multicast group. For example, the SMET forwarding next hops may include an L2-switched next hop and an L3-routed next hop.

The L2-switched next hop may include one or more remote PE devices that advertised a SMET route for the multicast group. PE devices 10 may switch multicast traffic received on its access-facing interface from a source VLAN (e.g., VLAN 11A) to core-facing interfaces on the same VLAN (referred to herein as "intra-VLAN switching") and use the L2-switched next hop to send the multicast traffic toward remote PE devices that advertised the SMET route. PE devices 10 may route multicast traffic received on a core-facing interface from a source VLAN (e.g., VLAN 11A) onto a listener VLAN (e.g., VLAN 11B) and send the multicast traffic on local interfaces toward a receiver that belongs to the listener VLAN and is interested in the multicast traffic. The L3-routed next hop may include an empty list of remote PE devices to prevent the multicast traffic from being sent back to the EVPN core after locally routing the multicast traffic from the source VLAN to the listener VLAN (referred to herein as "inter-VLAN routing").

In operation, PE devices 10 may each send SMET routes indicating interest in receiving multicast traffic for their multicast receivers. Each of PE devices 10 may configure L2-switched next hop based on the SMET routes and an L3-routed next hop with an empty list of remote PE devices. For example, PE device 10A may receive SMET routes from PE devices 10B and 10C indicating PE devices 10B and 10C each has an interested multicast receiver (e.g., multicast receivers 4C and 4E, respectively) on VLAN 11A. PE device 10A may also receive SMET routes from PE devices 10B and 10D indicating PE devices 10B and 10D each has an interested multicast receiver (e.g., multicast receivers 4D and 4F, respectively) on VLAN 11B. Using the SMET routes, PE device 10A may configure an L2-switched next hop for PE devices 10B-10D. PE device 10A also configures an L3-routed next hop with an empty list of remote PE devices. Similarly, PE device 10B may receive a SMET route from PE device 10C indicating PE device 10C has an interested multicast receiver (e.g., multicast receiver 4E) on VLAN 11A. PE device 10B may also receive SMET routes from PE device 10D indicating PE device 10D has an interested multicast receiver (e.g., multicast receiver 4F) on VLAN 11B. Using the SMET routes, PE device 10B may configure an L2-switched next hop for PE devices 10A, 10C and 10D. PE device 10B also configures an L3-routed next hop with an empty list of remote PE devices. Likewise, PE device 10C and 10D may each configure an L2-switched next hop using received SMET routes and configures an L3-routed next hop having an empty list of remote PE devices.

When PE device 10A receives multicast traffic 32 from multicast source 4A via its access-facing interface (e.g., from an attachment circuit belonging to VLAN 11A), PE device 10A performs a lookup of VRF 22A and determines from the L2-switched next hop that PE devices 10B-10D have interested multicast receivers (e.g., multicast receivers 4C-4F). PE device 10A may switch the multicast traffic received on its access-facing interface from source VLAN 11A to core-facing interfaces on the same VLAN and use the L2-switched next hop to send a copy of multicast traffic 32 to each of egress PE devices 10B-10D over intermediate network 12.

Egress PE devices 10B and 10C may each receive the copy of multicast traffic 32 over intermediate network 12 via its core-facing interface on the source VLAN. Egress PE devices 10B and 10C may each send the multicast traffic to IRB interfaces 28B and 28C, respectively, of the source VLAN. IRB interfaces 28B and 28C then send the multicast traffic on local attachment circuits of VLAN 11A to multicast receivers 4C and 4E, respectively.

In some examples, egress PE devices may use IRBs to locally route inter-subnet traffic between multiple VLANs. For example, when PE device 10B receives the multicast traffic over the EVPN core on VLAN 11A, PE device 10B may forward the multicast traffic received at IRB 28B to IRB 30B, thereby causing the multicast traffic to be bridged from source VLAN 11A to listener VLAN 11B. IRB 30B then sends the multicast traffic on local attachment circuits of VLAN 11B to multicast receiver 4D. In response to locally routing inter-subnet traffic between VLAN 11A and VLAN 11B, PE device 10B performs a lookup of VRF 22B to determine a next hop for PE devices configured with VLAN 11B. Since the L3-routed next hop has an empty list, PE device 10B does not send the multicast traffic back to the EVPN core.

Egress PE device 10D may receive the copy of multicast traffic 32 over intermediate network 12 via its core-facing interface and sends the traffic to IRB interface 28D of the source VLAN (e.g., in this case, SBD 14). PE device 10D may forward the multicast traffic received at IRB 28D to IRB 30D, thereby causing the multicast traffic to be bridged from SBD 14 to VLAN 11B. IRB 30D then sends the multicast traffic on local attachment circuits of VLAN 11B to multicast receiver 4F. In response to locally routing inter-subnet traffic between SBD 14 and VLAN 11B, PE device 10D performs a lookup of VRF 22D to determine a next hop for PE devices configured with VLAN 11B. Since the L3-routed next hop has an empty list, PE device 10D does not send the multicast traffic back to the EVPN core.

Figure 2:
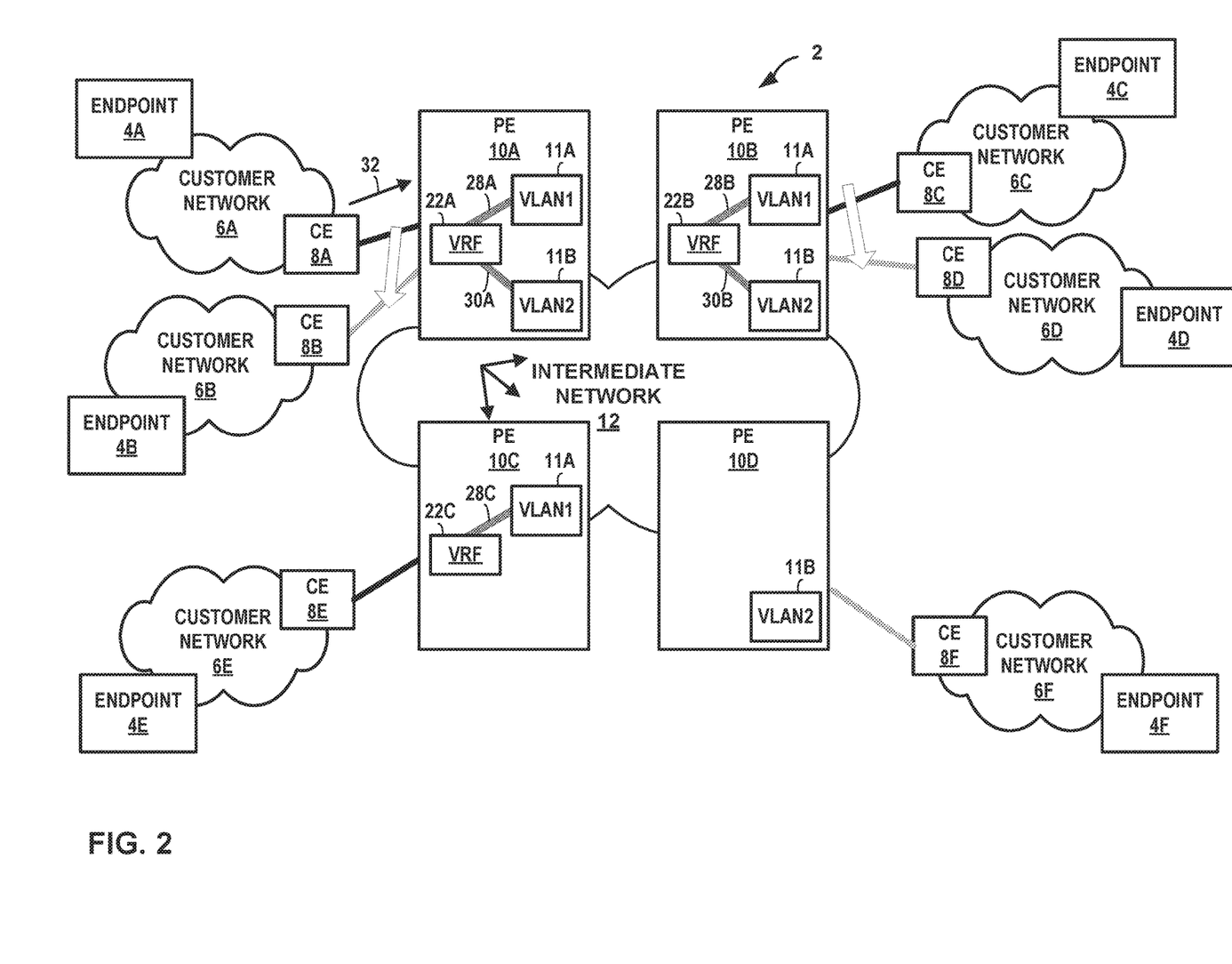
FIG. 2 is a block diagram illustrating another example network system for providing control plane-based OISM forwarding that accommodates IRB incapable devices, in accordance with the techniques described in this disclosure.

FIG. 2 is a block diagram illustrating another example network system for providing control plane-based OISM forwarding that accommodates IRB incapable devices, in accordance with the techniques described in this disclosure. In the example of FIG. 2, network system 200 includes one or more PE devices 10, e.g., PE device 10D, that may not be capable of locally routing inter-subnet traffic between VLANs (referred to as "routing incapable devices" or "IRB incapable devices"). For example, PE device 10D has a receiver on a listener VLAN (e.g., VLAN 11B) and does not have receivers on a source VLAN (e.g., VLAN 11A). If PE device 10D is incapable of implementing IRB, PE device 10D cannot locally route inter-subnet traffic from the source VLAN to a listener VLAN that includes an interested receiver for the multicast traffic. Typically, at least one PE device implements OISM and is configured as an IP Multicast Gateway (IPMG) device that assumes the role of forwarding the routed traffic from the source VLAN to the listener VLAN to the IRB incapable PE devices. Typically, the IPMG device, when routing from source VLAN to listener VLAN, sends the traffic on the listener VLAN towards the EVPN core, but it selectively sends the traffic only to the IRB incapable PE devices. When the IRB incapable PE devices receive the traffic on the listener VLAN, the IRB incapable PE devices forward the multicast traffic to the multicast receivers. Typically, the forwarding engine of the PE device that assumes the role of IPMG is programmed to implement IPMG forwarding of OISM. However, the forwarding engines of PE devices 10 may not be programmed to implement IPMG forwarding of OISM.

In accordance with the techniques described in this disclosure, one or more of PE devices 10, e.g., PE device 10B, may implement control plane-based IPMG forwarding of OISM. In the example of FIG. 1, PE device 10B may configure two types of SMET forwarding next hops. The SMET forwarding next hops may include an L2-switched next hop and an L3-routed next hop. Similar to the example described with respect to FIG. 1, the L2-switched next hop may include the one or more remote PE devices that advertised the SMET route. PE devices 10 may use the L2-switched next hop to send multicast traffic received on its access-facing interface from a source VLAN (e.g., VLAN 11A) to remote PE devices that advertised the SMET route. The L3-routed next hop may include a next hop with one or more IRB incapable PE devices. As one example, PE device 10D may not be configured to locally route inter-subnet traffic to VLAN 11B with IRBs. To send multicast traffic to PE device 10D on VLAN 11B, PE device 10B may configure an L3-routed next hop that specifies a next hop to PE device 10D. In this way, when PE device 10B receives multicast traffic over intermediate network 12 (e.g., via its core-facing interface) on VLAN 11A, PE device 10B may use IRBs 28B and 30B to locally route inter-subnet traffic between VLAN 11A and VLAN 11B, and may then use the L3-routed next hop to send the multicast traffic back to the EVPN core and only to PE device 10D. In this way, PE device 10B may use L3-routed next hop to send multicast traffic to only IRB incapable PE devices.

Figure 3:
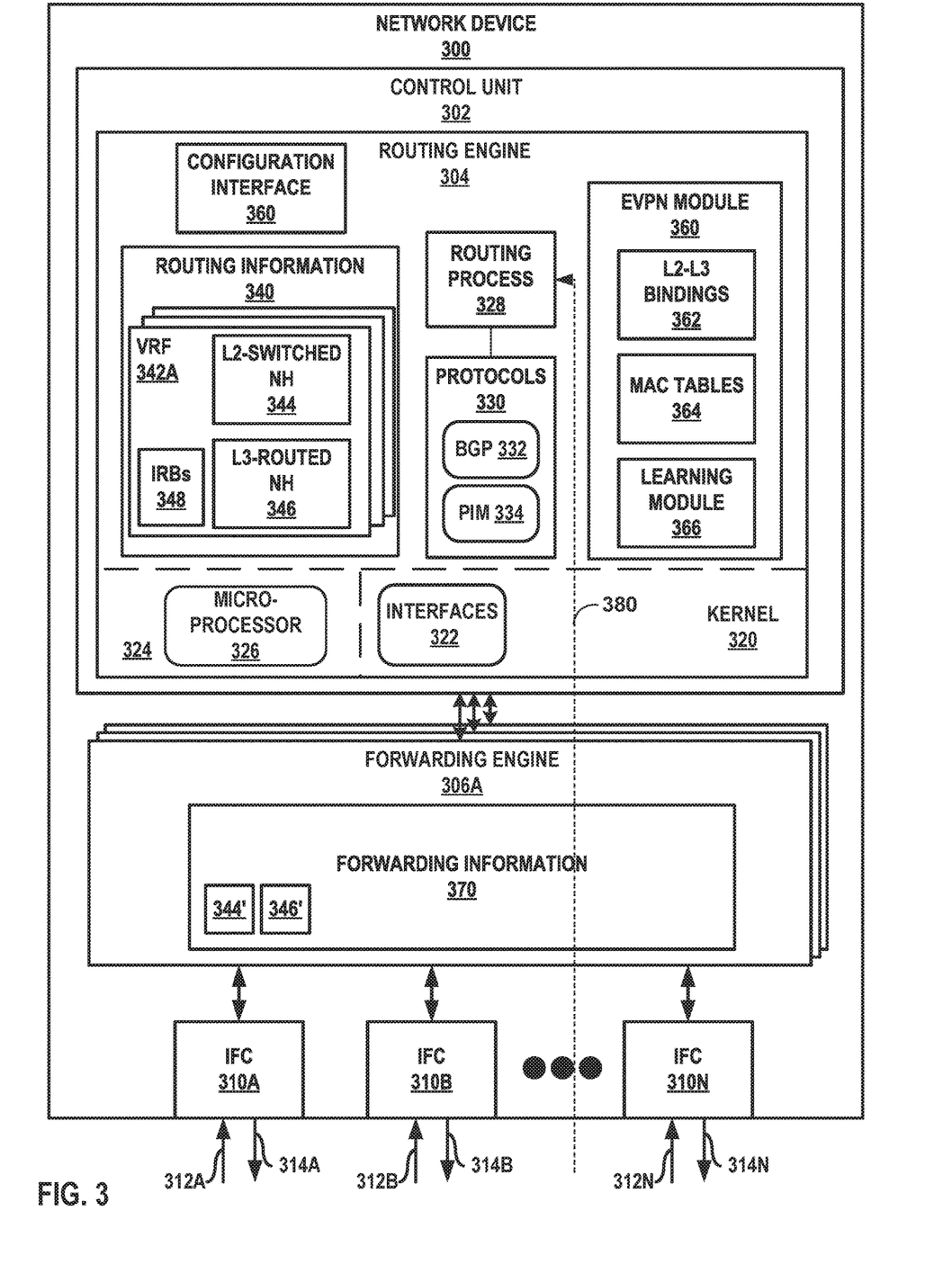
FIG. 3 is a block diagram illustrating an example provider edge device, in accordance with techniques described in this disclosure.

FIG. 3 is a block diagram illustrating a provider edge device, in accordance with techniques of the disclosure. PE device 300 may represent an example instance of any PE device 10 of FIGS. 1-2. PE device 300 includes a control unit 302 that includes a routing engine 304, and control unit 302 is coupled to forwarding engines 306A-306N (collectively, "forwarding engines 306"). Each of forwarding engines 306 is associated with one or more interface cards 310A-310N (collectively, "IFCs 310") that receive packets via inbound links 312A-312N (collectively, "inbound links 312") and send packets via outbound links 314A-314N (collectively, "outbound links 314"). IFCs 310 are typically coupled to links 312, 314 via a number of interface ports (not shown). Inbound links 312 and outbound links 314 may represent physical interfaces, logical interfaces, or some combination thereof.

Elements of control unit 302 and forwarding engines 306 may be implemented solely in software, or hardware, or may be implemented as combinations of software, hardware, or firmware. For example, control unit 302 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 302 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE device 300, e.g., protocols, processes, and modules. Control unit 302, in some examples, retrieves and executes the instructions from memory for these aspects.

Routing engine 304 includes kernel 320, which provides a run-time operating environment for user-level processes. Kernel 320 may represent, for example, a UNIX operating system derivative such as Linux or Berkeley Software Distribution (BSD). Kernel 320 offers libraries and drivers by which user-level processes may interact with the underlying system. Hardware environment 324 of routing engine 304 includes microprocessor 326 that executes program instructions loaded into a main memory (not shown in FIG. 3) from a storage device (also not shown in FIG. 3) in order to execute the software stack, including both kernel 320 and processes executing on the operating environment provided by kernel 320. Microprocessor 326 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 320 provides an operating environment for a routing process 328 that executes various protocols 330 at different layers of a network stack, including protocols for implementing Ethernet Virtual Private Networks. For example, routing engine 304 includes network protocols that operate at a network layer of the network stack. In the example of FIG. 3, network protocols include the Border Gateway Protocol (BGP) 332, which is a routing protocol, and Protocol Independent Multicast (PIM) 334. BGP 332 may include Multiprotocol BGP (MP-BGP). Routing engine 304 may include other protocols not shown in FIG. 3, such as an MPLS label distribution protocol and/or other MPLS protocols. Routing engine 304 is responsible for the maintenance of routing information 340 to reflect the current topology of a network and other network entities to which PE device 300 is connected. In particular, routing protocols periodically update routing information 340 to accurately reflect the topology of the network and other entities based on routing protocol messages received by PE device 300.

As shown in FIG. 3, PE device 300 may be configured with multiple VRFs including VRF 342A. VRF 342A represents a virtual routing and forwarding instance. VRF 342A includes at least one routing table for BGP 332. An attachment circuit may be associated with a particular VRF, such as VRF 342A, and the particular VRF may be configured to forward traffic for the attachment circuit.

Forwarding engines 306 represent hardware and logic functions that provide high-speed forwarding of network traffic. Forwarding engines 306 typically includes a set of one or more forwarding chips programmed with forwarding information that maps network destinations with specific next hops and the corresponding output interface ports. In general, when PE device 300 receives a packet via one of inbound links 312, one of forwarding engines 306 identifies an associated next hop for the data packet by traversing the programmed forwarding information based on information within the packet. One of forwarding engines 306 (either the ingress forwarding engine or a different egress forwarding engine) forwards the packet on one of outbound links 314 mapped to the corresponding next hop. Kernel 320 may generate forwarding information 370 to include representations of information stored to VRFs 342 and interfaces 322, in the form of forwarding information for optimized forwarding by forwarding engines 306.

In the example of FIG. 3, forwarding engine 306A includes forwarding information 370. In accordance with routing information 340, forwarding engine 306A stores forwarding information 370 that maps packet field values to network destinations with specific next hops and corresponding outbound interface ports. For example, routing engine 304 analyzes routing information 340 and generates forwarding information 370 in accordance with routing information 340. Forwarding information 370 may associate, for example, network destinations for certain multicast groups with specific next hops and corresponding IFCs 310 and physical output ports for outbound links 314. Forwarding information 370 may be maintained in the form of one or more tables, link lists, radix trees, databases, flat files, or any other data structures.

Forwarding engine 306A stores forwarding information 370 for each Ethernet VPN Instance (EVI) established by PE device 300 to associate network destinations with specific next hops and the corresponding interface ports. In general, when PE device 300 receives a data packet via one of inbound links 312, forwarding engine 306A, for example, identifies an associated next hop for the data packet by traversing forwarding information 370 based on information (e.g., labeling or header information) within the packet. Forwarding engine 306A forwards the data packet on one of outbound links 314 to the corresponding next hop in accordance with forwarding information 370. At this time, forwarding engine 306A may push and/or pop labels from the packet to forward the packet along a correct LSP.

Routing engine 304 includes a configuration interface 360 that receives and may report configuration data for PE device 300. Configuration interface 350 may represent a command line interface; a graphical user interface; Simple Network Management Protocol (SNMP), Netconf, or another configuration protocol; or some combination of the above in some examples. Configuration interface 350 receives configuration data configuring the PE device 300 with VRFs 342, interfaces 322, and other constructs that at least partially define the operations for PE device 300.

Routing engine 304 also includes an EVPN module 360 having a learning module 362 that performs layer two (L2) learning. Learning module 362 may perform remote learning using BGP 332. EVPN module 360 may maintain MAC tables 364 for each EVI configured in PE device 300, or in alternative examples may maintain one or more MAC tables 364 that are independent of each respective EVI. MAC tables 364 may also include one or more VLANs mapped to a single EVI. One of MAC tables 364, for instance, may represent a virtual routing and forwarding table of VRFs 342A for an EVI configured for VRF 342A and for which one or more of IRBs 348 is a routing interface. Learning module 366 may alternatively be configured for execution, in full or in part, by forwarding engine 306A. In some examples, EVPN module 360 may be part of or executed by routing process 328.

Learning module 366 may perform local L2/L3 (e.g., MAC/IP) binding learning by, e.g., using MAC and IP address information received by PE device 300 in Address Resolution Protocol (ARP) or Neighbor Discovery Protocol (NDP) messages. Learning module 366 may detect a new MAC address on an EVI access interface for an EVI and add the MAC address, with a mapping to the EVI access interface, to one of the MAC tables 364 for the EVI. Learning module 366 may then advertise an EVPN MAC/IP advertisement route using BGP 332 to remote PE devices for the EVI. The MAC advertisement route may include a route target corresponding to the EVI, the MAC address, the Ethernet tag for the bridge domain in which the MAC address was learned, the IP address corresponding to the MAC address (if known and if an IRB is configured for the bridge domain, e.g., one of IRBs 348), and an EVPN label. With remote MAC learning, learning module 366 may receive an EVPN MAC/IP advertisement route from another PE device and install a host route for the IP address (if included) with protocol type EVPN to the appropriate VRF 342 for the EVI and install the MAC address in the MAC table 364 of the EVI, as well as the MAC information associated with the host route in the VRF 342 including the EVPN label.

EVPN module 360 may maintain one or more L2 address-L3 address (L2-L3) bindings 362 received and learned from peer PE devices for the EVI via BGP 332. In some examples, L2-L3 bindings 362 may be stored in a distinct binding table or other data structure. In some examples, L2-L3 bindings 362 may be stored in ARP (or NDP) tables (not shown). In some examples, L2-L3 bindings 362 may be stored as routing advertisements generated by PE device 300 using information from ARP (or NDP) tables or received from other PE devices for an EVI.

Routing process 328 outputs control-plane messages to automatically establish tunnels such as LSPs, and otherwise provision one or more EVPNs between PE device 300 and each of the other PE devices participating in the EVPNs. Routing process 328 may signal the PE devices using one or more suitable L3 protocols, such as BGP 332. Routing process 328 can communicate with forwarding engine 306A to automatically update forwarding information 370.

VRF 342A is further configured with IRBs 348, the logical interfaces for which are installed (or "configured") to forwarding information 370 of forwarding engine 306A. Kernel 320 includes an interfaces table 322 ("interfaces 322") that represents a data structure that includes a corresponding entry for each logical interface configured for PE device 300. Interfaces 322 includes an entry for IRBs 348. Entries for respective logical interfaces may specify respective current information describing the logical interfaces. Kernel 320 also executes ARP and/or NDP to generate and inject an ARP request and/or NDP neighbor solicitation into the data plane for output via IFCs 310, as well as receive ARP and/or NDP messages. VRF 342A stores Selective Multicast Ethernet Tag (SMET) routes (e.g., EVPN Type 6 route) received by routing process 328 in BGP messages from other PE devices or generated by routing process 328 using locally-learned information.

PE device 300 receives one or more SMET route(s) 380 from other PE devices at one or more of IFCs 310. IFCs 310 stores the SMET routes 380 to a memory accessible by routing engine 304. Routing process 328 processes the SMET routes 380 to build a list of SMET next hops (e.g., a list of outgoing interfaces) which can be used to selectively replicate and forward multicast traffic. In accordance with the techniques described herein, routing process 328 generates L2-switch next hop 344 and L3-routed next hop 346. L2-switch next hop 344 may include one or more other PE devices that advertised the SMET routes 380. PE device 300 may switch multicast traffic received on its access-facing interface from a source VLAN (e.g., VLAN 11A of FIG. 1) to core-facing interfaces on the same VLAN, and use the L2-switched next hop 344 to send the switched multicast traffic to remote PE devices that advertised the SMET route. For example, routing engine 304 analyzes L2-switched next hop 344 in routing information 340 and generates specific next hop, e.g., L2-switched next hop 344', in forwarding information 370. L2-switched next hop 344' may be implemented as microcode, which when executed, performs one or more operations. When PE device 300 receives a multicast packet from a multicast source via its access-facing interface, PE device 300 determines the apparent source VLAN of the multicast packet (e.g., from VLAN ID), determines the layer 2 (S, G) state for that VLAN (or the (*, G) state), and takes the list of outgoing interfaces (OIF) from that state indicated by L2-switched next hop 344' in forwarding information 370. Using the L2-switched next hop 344' in forwarding information 370, PE device 300 may send the multicast traffic to the one or more other PE devices that advertised the SMET route 380 using an interface identified by L2-switched next hop 344'.

In some examples, L3-routed next hop 346 in routing information 304 may include an empty list of remote PE devices to prevent PE device 300 from sending the multicast traffic received from the EVPN core on a source VLAN and then routed onto a listener VLAN back to the EVPN core. Routing engine 304 analyzes L3-routed next hop 346 in routing information 340 and generates specific next hop, e.g., L3-routed next hop 346', in forwarding information 370. L3-routed next hop 346' may be implemented as microcode, which when executed, performs one or more operations. As one example, PE device 300 may receive multicast traffic via its core-facing interface on the source VLAN. PE device 300 may use IRBs 348 to locally route inter-subnet traffic from the source VLAN to the listener VLAN. In response to locally routing inter-subnet traffic between VLANs, PE device 300 may use the L3-routed next hop 346' in forwarding information 370 that has an empty list of PE devices (e.g., a value of 0) and does not send the multicast traffic back to the EVPN core.

In some examples, L3-routed next hop 346 may include a next hop with IRB incapable PE devices (e.g., PE device 10D of FIG. 2). To send multicast traffic to the IRB incapable PE devices, routing process 328 may configure an L3-routed next hop 346 that includes a next hop to the IRB incapable PE devices. Routing engine 304 analyzes L3-routed next hop 346 in routing information 340 and generates specific next hop, e.g., L3-routed next hop 346', in forwarding information 370 that specifies one or more corresponding interface ports to reach IRB incapable PE devices. In this way, when PE device 300 receives multicast traffic over its core-facing interface on a source VLAN (e.g., VLAN 11A of FIG. 2), PE device 300 may use IRBs 348 to locally route inter-subnet traffic from the source VLAN to a listener VLAN (e.g., VLAN 11B of FIG. 2), and may then use the L3-routed next hop 346' in forwarding information 370 to send the multicast traffic back to the EVPN core on the listener VLAN to only the IRB incapable PE devices.

Figure 4:
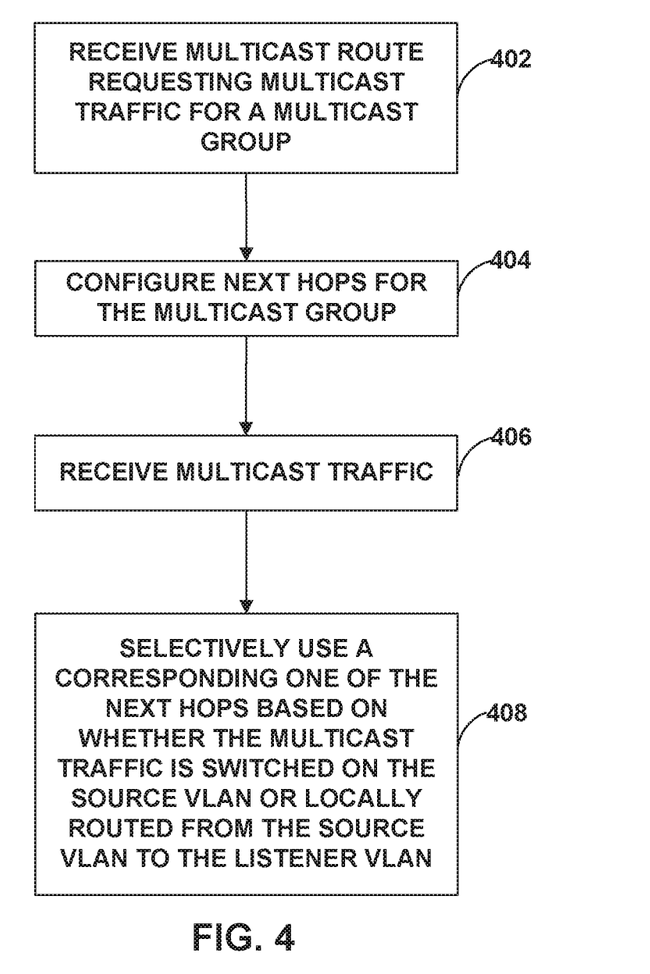
FIG. 4 is a flowchart illustrating an example mode of operation of a network device, in accordance with techniques described in this disclosure.

FIG. 4 is a flowchart illustrating an example operation of a provider edge device, in accordance with the techniques described in this disclosure. For illustration purposes, FIG. 4 is described with respect to PE device 300 of FIG. 3 operating as any of PE devices 10 of FIG. 1.

As one example, PE device 10B may receive a multicast route (e.g., SMET route) from one or more other PE devices (e.g., PE devices 10A, 10C, and 10D) requesting multicast traffic for a multicast group (402). For example, PE devices 10A, 10C, and 10D may receive IGMP Join messages from customer endpoints 4 that includes information that customer endpoints 4 has joined a multicast group. PE devices 10A, 10C, and 10D may each send a SMET route to PE device 10B indicating their interest in receiving multicast traffic for a specific multicast group.

In response to receiving the SMET route from the one or more other PE devices, PE device 10B configures next hops for the multicast group (404). For example, PE device 10B may receive SMET routes from PE device 10C indicating its interest in receiving multicast traffic on VLAN 11A. PE device 10B may also receive SMET routes from PE devices 10A and 10D indicating their interest in receiving multicast traffic on VLAN 11B. PE device 10B may configure an L2-switched next hop specifying the PE devices that sent a SMET route, e.g., PE devices 10A, 10C, and 10D, as a next hop for multicast traffic for the multicast group that is received on an access-facing interface of the PE device and switched on a source Virtual Local Area Network (VLAN). PE device 10B configures an L3-routed next hop specifying a list as a next hop for multicast traffic for the multicast group that is received over an EVPN core on a core-facing interface of the PE device and locally routed from the source VLAN to a listener VLAN. In one example, PE device 10B may specify an empty list of remote PE devices to prevent multicast traffic from being sent back into the EVPN core in response to locally routing the inter-subnet multicast traffic between VLANs. In some examples in which one or more of the plurality of PE devices are IRB incapable, PE device 10B may specify a list of the IRB incapable devices to send multicast traffic back into the EVPN core and only to the IRB incapable devices.

PE device 10B may receive multicast traffic via an interface of a plurality of interfaces (406) and selectively use a corresponding one of the next hops (e.g., L2-switched next hop or L3-routed next hop) based on whether the multicast traffic is switched on the source VLAN (i.e., "intra-VLAN switched") or routed from the source VLAN to the listener VLAN (i.e., "inter-VLAN routed") (408). In some examples, PE device 10B may receive multicast traffic via an access-facing interface. For example, PE device 10B may receive multicast traffic via one of inbound links 312 to an attachment circuit to an endpoint 4 operating as a multicast source on a source VLAN. PE device 10B may switch multicast traffic received on its access-facing interface from a source VLAN (e.g., VLAN 11A of FIG. 1) to core-facing interfaces on the same VLAN, and use the L2-switched next hop 344 to send the switched multicast traffic to remote PE devices that advertised the SMET route. For example, PE device 10B may forward the multicast traffic on core-facing interfaces on the same source VLAN to PE devices that sent a SMET route, e.g., PE devices 10A, 10C, and 10D. In some examples, PE device 10B may receive multicast traffic over the EVPN core 12 via a core-facing interface. For example, PE device 10B may receive multicast traffic via one of inbound links 312 to EVPN core 12 on a source VLAN. PE device 10B may locally route inter-subnet traffic from a source VLAN (e.g., VLAN 11A of FIG. 1) to a listener VLAN (e.g., VLAN 11B of FIG. 1). For example, when PE device 10B receives the multicast traffic over the EVPN core via a core-facing interface on VLAN 11A, PE device 10B may forward the multicast traffic received at IRB 28B to IRB 30B, thereby causing the multicast traffic to be bridged from source VLAN 11A to listener VLAN 11B. In response to locally routing inter-subnet traffic between VLAN 11A and VLAN 11B, PE device 10B performs a lookup of the VRF (e.g., VRF 22B of FIG. 1) to determine a next hop for PE devices configured with VLAN 11B. Since the L3-routed next hop has an empty list, PE device 10B does not send the multicast traffic back to the EVPN core. In some examples, the L3-routed next hop 346 may include a list of IRB incapable PE devices. In these examples, PE device 10B may forward multicast traffic back into the EVPN core on the listener VLAN to only the IRB incapable PE devices.

The techniques described herein may be implemented in hardware, software, firmware, or any combination thereof. Various features described as components, units or modules may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples,

What is claimed is:

1. A method comprising:
receiving, by a provider edge (PE) device of a plurality of PE devices configured with an Ethernet Virtual Private Network (EVPN) instance, a multicast route from one or more other PE devices of the plurality of PE devices requesting multicast traffic for a multicast group;
configuring, by the PE device, next hops for the multicast group, wherein the next hops comprise a layer 2-switched next hop that specifies the one or more other PE devices as a next hop for multicast traffic for the multicast group that is received on an access-facing interface of the PE device and switched on a source Virtual Local Area Network (VLAN), and wherein the next hops further comprise a layer 3-routed next hop that specifies a list as a next hop for multicast traffic for the multicast group that is received over an EVPN core on a core-facing interface of the PE device and locally routed from the source VLAN to a listener VLAN, wherein the list comprises an empty list of the plurality of PE devices to prevent the PE device from sending the multicast traffic back into the EVPN core or a list of at least one Integrated Routing and Bridging (IRB) incapable PE device to send the multicast traffic back into the EVPN core to the at least one IRB incapable PE device;
receiving, by the PE device, multicast traffic on an interface of a plurality of interfaces, wherein the plurality of interfaces includes the access-facing interface and the core-facing interface; and
selectively using, by the PE device, a corresponding one of the next hops based on whether the multicast traffic is switched on the source VLAN or locally routed from the source VLAN to the listener VLAN.

2. The method of claim 1, wherein the multicast route comprises a Selective Multicast Ethernet Tag (SMET).

3. The method of claim 1,
wherein receiving the multicast traffic comprises receiving the multicast traffic on the access-facing interface, and
wherein selectively using the corresponding one of the next hops comprises selectively using the layer 2-switched next hop in response to determining that the PE device switched the multicast traffic received on the access-facing interface from the source VLAN to one or more core-facing interfaces on the source VLAN.

4. The method of claim 1,
wherein receiving the multicast traffic comprises receiving the multicast traffic on the core-facing interface, and
wherein selectively using the corresponding one of the next hops comprises selectively using the layer 3-routed next hop in response to determining that the PE device locally routed the multicast traffic received on the core-facing interface from the source VLAN to the listener VLAN.

5. The method of claim 4, wherein selectively using the layer 3-routed next hop comprises:
preventing, by the PE device and based on the empty list, the PE device from sending the multicast traffic back into the EVPN core.

6. The method of claim 4,
wherein the plurality of PE devices includes the at least one IRB incapable PE device that does not locally route the multicast traffic from the source VLAN to the listener VLAN,
wherein the list specifies the at least one IRB incapable PE device as a next hop, and
wherein selectively using the layer 3-routed next hop comprises sending, by the PE device and based on the list specifying the at least one IRB incapable PE device as the next hop, the multicast traffic back into the EVPN core and only to the at least one IRB incapable PE device.

7. The method of claim 1, wherein a forwarding engine of at least one of the plurality of PE devices is not programmed to implement Optimized Inter-Subnet Multicast (OISM).

8. A network device operable as a provider edge (PE) device comprising:
one or more processors operably coupled to a memory, wherein the one or more processors are configured to:
receive a multicast route from one or more other PE devices of a plurality of PE devices including the PE device requesting multicast traffic for a multicast group;
configure next hops for the multicast group, wherein the next hops comprise a layer 2-switched next hop that specifies the one or more other PE devices as a next hop for multicast traffic for the multicast group that is received on an access-facing interface of the PE device and switched on a source Virtual Local Area Network (VLAN), and wherein the next hops further comprise a layer 3-routed next hop that specifies a list as a next hop for multicast traffic for the multicast group that is received over an EVPN core on a core-facing interface of the PE device and locally routed from the source VLAN to a listener VLAN, wherein the list comprises an empty list of the plurality of PE devices to prevent the PE device from sending the multicast traffic back into the EVPN core or a list of at least one Integrated Routing and Bridging (IRB) incapable PE device to send the multicast traffic back into the EVPN core to the at least one IRB incapable PE device;
receive multicast traffic on an interface of a plurality of interfaces, wherein the plurality of interfaces includes the access-facing interface and the core-facing interface; and
selectively use a corresponding one of the next hops based on whether the multicast traffic is switched on the source VLAN or locally routed from the source VLAN to the listener VLAN.

9. The network device of claim 8, wherein the multicast route comprises a Selective Multicast Ethernet Tag (SMET).

10. The network device of claim 8,
wherein, to receive the multicast traffic, the one or more processors are further configured to receive the multicast traffic on the access-facing interface, and
wherein, to selectively use the corresponding one of the next hops, the one or more processors are further configured to selectively using the layer 2-switched next hop in response to determining that the PE device switched the multicast traffic received on the access-facing interface from the source VLAN to one or more core-facing interfaces on the source VLAN.

11. The network device of claim 8,
wherein, to receive the multicast traffic, the one or more processors are further configured to receive the multicast traffic on the core-facing interface, and
wherein, to selectively use the corresponding one of the next hops, the one or more processors are further configured to selectively use the layer 3-routed next hop in response to determining that the PE device locally routed the multicast traffic received on the core-facing interface from the source VLAN to the listener VLAN.

12. The network device of claim 11, wherein to selectively use the layer 3-routed next hop, the one or more processors are configured to:
prevent, based on the empty list, the PE device from sending the multicast traffic back into the EVPN core.

13. The network device of claim 11,
wherein the plurality of PE devices includes the at least one IRB incapable PE device that does not locally route the multicast traffic from the source VLAN to the listener VLAN,
wherein the list specifies the at least one IRB incapable PE device as a next hop, and
wherein to selectively use the layer 3-routed next hop, the one or more processors are configured to send the multicast traffic back into the EVPN core and only to the at least one IRB incapable PE device.

14. The network device of claim 8, wherein a forwarding engine of at least one of the plurality of PE devices is not programmed to implement Optimized Inter-Subnet Multicast (OISM).

15. A non-transitory computer-readable medium comprising instructions for causing one or more programmable processors of a provider edge (PE) device to:
receive a multicast route from one or more other PE devices of a plurality of PE devices including the PE device requesting multicast traffic for a multicast group;
configure next hops for the multicast group, wherein the next hops comprise a layer 2-switched next hop that specifies the one or more other PE devices as a next hop for multicast traffic for the multicast group that is received on an access-facing interface of the PE device and switched on a source Virtual Local Area Network (VLAN), and wherein the next hops further comprise a layer 3-routed next hop that specifies a list as a next hop for multicast traffic for the multicast group that is received over an EVPN core on a core-facing interface of the PE device and locally routed from the source VLAN to a listener VLAN, wherein the list comprises an empty list of the plurality of PE devices to prevent the PE device from sending the multicast traffic back into the EVPN core or a list of at least one Integrated Routing and Bridging (IRB) incapable PE device to send the multicast traffic back into the EVPN core to the at least one IRB incapable PE device;
receive multicast traffic on an interface of a plurality of interfaces, wherein the plurality of interfaces includes the access-facing interface and the core-facing interface; and
selectively use a corresponding one of the next hops based on whether the multicast traffic is switched on the source VLAN or locally routed from the source VLAN to the listener VLAN.

16. The non-transitory computer-readable medium of claim 15, wherein the multicast route comprises a Selective Multicast Ethernet Tag (SMET).

17. The non-transitory computer-readable medium of claim 15,
wherein the plurality of PE devices includes at least one Integrated Routing and Bridging (IRB) incapable PE device that does not locally route the multicast traffic from the source VLAN to the listener VLAN, and
wherein the list specifies the at least one IRB incapable PE device as a next hop to send the multicast traffic back into the EVPN core and only to the IRB incapable PE device.

18. The non-transitory computer-readable medium of claim 15,
wherein to receive the multicast traffic, the instructions further cause the one or more programmable processors of the PE device to receive the multicast traffic on the core-facing interface, and
wherein, to selectively use the corresponding one of the next hops, the instructions further cause the one or more programmable processors of the PE device to instructions for causing one or more programmable processors of a provider edge (PE) device to selectively use the layer 3-routed next hop in response to determining that the PE device locally routed the multicast traffic received on the core-facing interface from the source VLAN to the listener VLAN.

19. The non-transitory computer-readable medium of claim 18, wherein to selectively use the layer 3-routed next hop, the instructions further cause the one or more programmable processors of the PE device to prevent, based on the empty list, the PE device from sending the multicast traffic back into the EVPN core.

20. The non-transitory computer-readable medium of claim 18,
wherein the plurality of PE devices includes the at least one IRB incapable PE device that does not locally route the multicast traffic from the source VLAN to the listener VLAN,
wherein the list specifies the at least one IRB incapable PE device as a next hop, and
wherein to selectively use the layer 3-routed next hop, the instructions further cause the one or more programmable processors of the PE device to send the multicast traffic back into the EVPN core and only to the at least one IRB incapable PE device.

* * * * *